UNITED STATES PATENT OFFICE 2,688,572

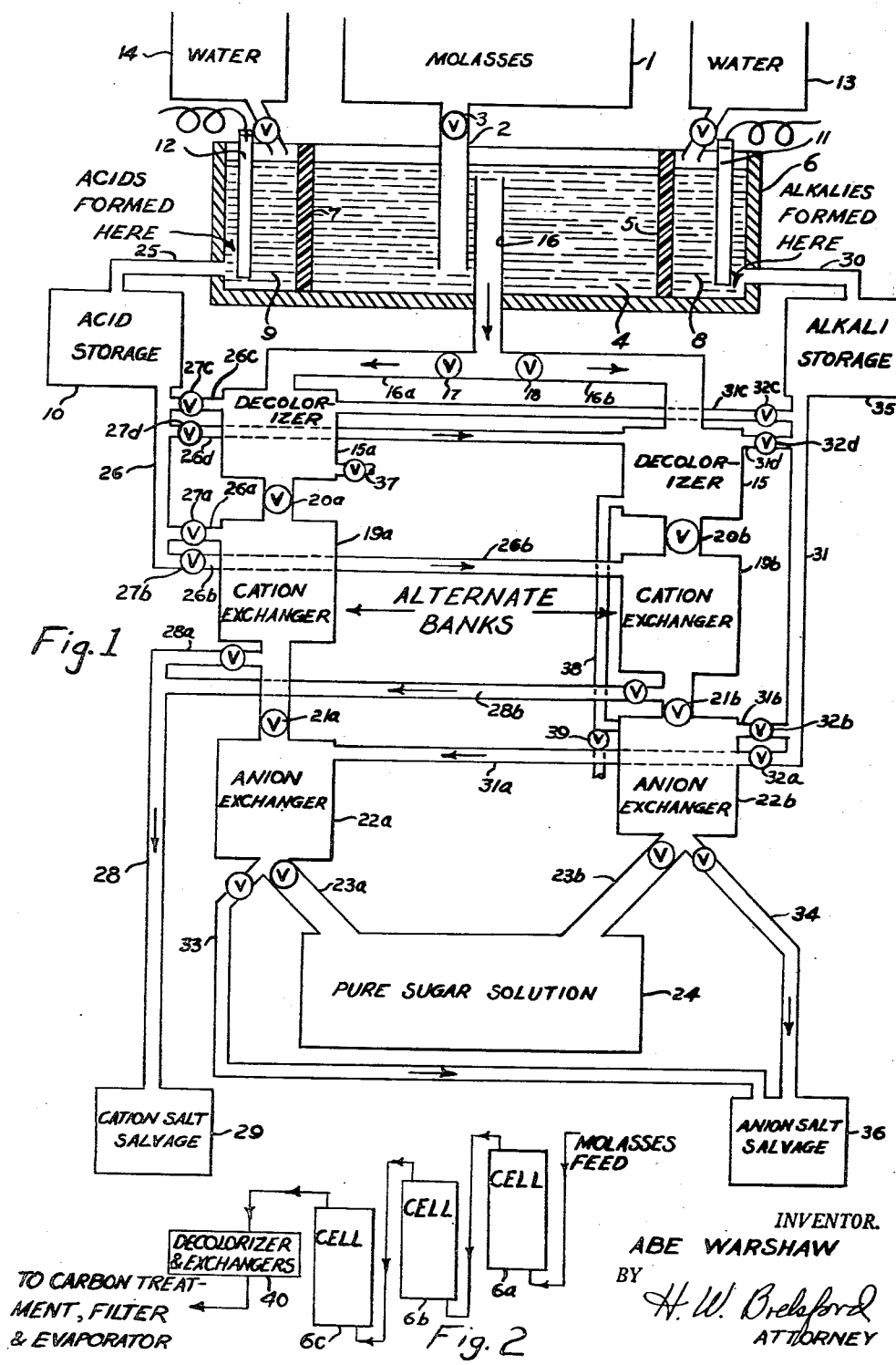

LIQUID PURIFICATION BY ELECTRODIALYSIS AND ION EXCHANGE

Abe Warshaw, Santa Maria, Calif.

Application September 27, 1950, Serial No. 186,982

8 Claims. (Cl. 127—54)

My invention relates to the purification of liquids and has particular reference to the removal of polar impurities from liquids by a process employing an electrodialysis step combined with an ion exchange step.

While my process is of general applicability to the purification of liquids, it is especially suited for liquids having a nonpolar solute dissolved therein. The solute may be a desired end product but initially may be heavily contaminated by polar impurities such as salts, proteins, amino acids, gums, pectins, and organic and inorganic acids. The polar substances ionize in solution and are subject to migration due to electric forces and also readily react to ion exchange. The nonpolar substances do not ionize, remain electrically neutral and are not affected by electric forces or ion exchange conditions. Thus my process is well suited to the purification of molasses since the sugars present are nonpolar and nearly all the other substances or impurities are polar. I will describe my invention, for purposes of illustration only, as applied to the purification of sugar solutions containing a relatively large amount of the impurities above mentioned.

Both electrodialysis and ion exchange are old and well known in the prior art. Both have been tried individually to purify molasses, and while they effectively remove impurities, both have proved to be uneconomical.

The electrodialysis apparatus employs a cell or tank wherein are disposed positive and negative electrodes that are partitioned off from the inlet or central portion of the cell by porous partitions of parchment, treated textile or other substance. The porous partitions set up a mechanical barrier to the molecules in solution, tending to confine them to the inlet portion of the cell. The ionized particles are urged toward the electrodes by the electric attraction and hence work their way through the porous membrane. The process is dependent upon the conductivity of the solution, and as the ionized impurities are removed, the conductivity drops, requiring greater voltages, greater expense and giving poorer results as the sugar breaks down under the higher electric forces necessary.

The ion exchange process substitutes an inoffensive or readily controllable ion for the impurity ion in solution. Thus the positively charged ions (cations) may be exchanged for hydrogen ions and the negatively charged ions (anions) may be exchanged for hydroxyl, or OH ions. The hydrogen ions and the OH ions then combine to form water and are thus readily eliminated. As the supply of exchange ions from the exchanger material becomes exhausted the exchanger must be regenerated. This is done by flushing out the impurity ions that adhere to the exchanger materials and by substituting hydrogen and OH ions. Thus acids and bases are used to regenerate the cation exchanger and the anion exchanger respectively.

The ion exchange process operates effectively to remove ionized impurities but on materials with a high percentage of impurities such as final molasses, the cost of regeneration of the exchange material is so high that this process is not commercially economical.

I have discovered a process combining electrodialysis and ion exchange in such a fashion as to utilize the efficient and economic portions of each step with the result that a low cost purification is effected. I employ the initial part of the electrodialysis step to remove the bulk of the impurities and stop this step before the conductivity is so poor as to render this step expensive. The solution thus partially electrolyzed is subjected to an ion exchange step for final purification. Because the bulk of the impurities is already removed, a large amount of liquid can be processed before regeneration is necessary. Thus the regeneration is rendered economical, considering the amount of the final product.

My invention also includes another important step or operation. I have discovered that the acids and alkalies generated at the anode and cathodes of the electrodialysis cell, instead of being disposed of as heretofore, may be used as the acids and alkalies for regenerating the exchanger materials of the subsequent ion exchange step. Thus the cost of regenerating material is eliminated, rendering this process even more economical. Furthermore, these acids and alkalies are of the proper dilution in the cell, permitting them to be used directly as regenerators. Additionally, I am able to salvage the regeneration wash and recover the salts of the original impurities.

It is therefore a general object of my invention to provide an improved purification process for liquids having polar impurities.

Another general object is to provide an improved purification process for nonpolar solute solutions for removing polar impurities therefrom.

Another object is to provide an improved liquid purification process employing a primary electrodialysis step and a subsequent ion exchange step.

Another object is to provide a chemically self-contained electrodialysis and ion exchange purification process wherein by-product acids and bases from the electrodialysis step are used to regenerate the exchangers of the ion exchange step.

A further general object is to provide a treatment process for liquids for separating polar substances from liquids wherein these substances are first concentrated in an electrodialysis step; second, further removed in an ion exchange step; and third, the polar concentrates from the first step are used to liberate the polar substances from the exchanger material of the second step.

Still another object is to provide an economical process for purifying molasses including a primary electrodialysis step and a subsequent ion exchange step.

Still a further object is to provide an economical process for purifying molasses wherein polar impurities are concentrated at the electrodes of electrodialysis cells and are utilized to regenerate ion exchangers which have been used to effect subsequent purification of the molasses.

Another object is to provide a purification process for final molasses wherein impurities are removed by employing dilutions with water of about 50%.

Other objects and advantages of my invention will be apparent in the following description and claims considered together with the accompanying drawing wherein:

Fig. 1 is a schematic diagram of my apparatus illustrating generally the flow of materials and the treatments thereof, and Fig. 2 is a schematic diagram of a series of my cells in cascade.

Considering the illustrative substance molasses with respect to which I will describe my process, the material is approximately the same whether it is obtained from cane or from sugar beets. After one strike of sugar has been crystallized from the juice the resultant product is known as A molasses and may have an ash content of about 2%. When sugar is crystallized from A molasses, the resulting liquid is known as B molasses and may have an ash content from 4 to 6%. When a third strike of sugar has been removed, the resulting liquid is known as C molasses or final molasses and may have an ash content from 9 to 15%, by weight. If cane juice is used this final product is also known as blackstrap molasses.

Final molasses has a high sugar (sucrose) content of from 48 to 55% and is thus potentially valuable as a source of sugar. The impurities are so difficult to separate from the sugar, however, that the sugar has been utilized primarily by fermention to produce other products. This market is rapidly disappearing as alcohol, the principal fermentation product, can be made by cheaper processes. The final molasses has thus become a drug on the market having only limited use in cattle feeds and similar low dollar value uses.

The final molasses is generally chemically neutral as a result of the sugar refining process wherein neutrality must be preserved to prevent the formation of invert sugar which impedes crystallization. This material is so concentrated that fermentation or spoilage seldom occurs. In addition to the sugar the molasses may contain from 10 to 12% of inorganic salts of sodium and potassium as well as calcium and magnesium. Also it may contain from 12 to 15% of organic impurities; such as organic acids, gums, pectins and proteins. Salts of organic acids are present and cane molasses may have salts of aconitic acid present, while beet molasses may have salts of glutamic acid.

A typical ash analysis of final beet molasses may have the following analysis, reflecting chiefly the inorganic impurities.

| | Percent of liquid molasses |
|---|---|
| Infusible and insoluble | .011 |
| $SiO_2$ | .009 |
| $Fe_2O_3$ and $Al_2O_3$ | .049 |
| $CaCO_3$ | .114 |
| $MgCO_3$ | .023 |
| $Na_2CO_3$ | .723 |
| $KCl$ | .485 |
| $K_2SO_4$ | 2.156 |
| $K_2CO_3$ | 6.435 |
| Total ash | 10.005 |

From the foregoing it is apparent that final molasses contains a heavy percentage of complex impurities that differ greatly in composition. These impurities have heretofore given rise to a difficult problem of removal in attempting to render the sugar pure enough for commercial use.

Various methods have been employed to refine final molasses, and two general approaches have been made. One line of approach or attack has been to remove the sugar from the solution containing the impurities. The other approach has been to remove the impurities, leaving a relatively pure sugar solution. My invention follows this latter approach of removing the impurities so that a commercially pure sugar solution remains. This sugar solution may be sold directly to canners and the like, or may be subject to a crystallizing step to remove the sugar.

I employ commercial final molasses in my process. I dilute this final molasses with about 50% of its volume of water. This small quantity of water is in contrast to most purification processes wherein the molasses may be diluted with water up to 10 times its original volume.

Referring to the drawing, this diluted final molasses may be placed in a tank 1, from whence it may flow thru a pipe 2 under the control of a valve 3 into the bottom of a central compartment 4 of an electrodialysis cell 6. Porous partitions 5 and 7 may enclose electrode wells 8 and 9 at each end of the cell. A negative and positive electrode 11 and 12 may be placed respectively in these wells. Water may be fed at a regulated rate to each well from tanks 13 and 14. This water may be commercial water of any type.

The electrodes 11 and 12 may be connected to opposite poles of a source of direct electrical current, not shown, such as a generator, convertor, battery, etc. The difference in voltage between the electrodes subjects the entire cell 6 to an electrostatic force, causing the polarized particles or ions to migrate according to the charge they bear. The positively charged particles (cations) migrate toward the negative electrode 11, pass thru the partition 5 and are neutralized by receiving an electron from the electrode 11. They thereupon react with the water present to form a base or alkali by combining with an $OH^-$ radical.

The negatively charged particles (anions) are induced by the electrostatic force to travel to the positive electrode 12. Accordingly they work their way thru the porous partition 7 to the positive electrode where they deliver up their surplus electron and become neutralized. They thereupon react with the water present to form an acid by combining with the $H^+$ radical.

In this manner bases are formed in the right well 8 and acids are formed in the left well 9. Water is supplied to the wells to maintain their liquid level equal to or less than that of the molasses in the center part 4, so that there will be little tendency of diluting the molasses.

The inorganic impurities of the molasses are almost completely polarized and respond readily to the electrodializing action. The organic impurities respond less readily because of the large size of molecules, but in time these also migrate thru the partitions into the wells. Certain of the organic impurities such as gums are initially nonpolar, but these compounds seem to break up during the electrodializing step into polar compounds and thus are removed also. The sugar is nonpolar and is confined by the partitions 5 and 7 to the central part 4 of the cell. Since the sugar molecules are large and are not subject to electric forces, the porous partitions 5 and 7 are effective mechanical barriers to confine the sugar in the central part 4.

The entire electrodialysis step may be continuous. For this reason I provide alternate banks of ion exchange apparatus to maintain this continuous operation. An outlet pipe 16 may take the lighter, purer molasses from the top of the central cell part 4 and may have its lower end bifurcated as at 16e and 16b and each branch may be controlled by valves 17 and 18 respectively. The bifurcated branches 16a and 16b may lead to identical ion exchange banks including decolorizers 15a and 15b connected by valved pipes 20a and 20b to cation exchanger tanks 19a and 19b connected by pipes with valves 21a and 21b to anion exchanger tanks 22a and 22b. Valved outlets 23a and 23b may deliver to a sugar solution tank 24.

To make the process continuous one of the valves 17 or 18 is closed and the other opened. The electrolized sugar solution flows thru the open valves to become further purified in the decolorizers and the cation and anion exchangers. In the meantime the other bank of exchangers and its decolorizer is being regenerated by the alkalies and acids formed in the electrode wells. For this purpose the acid well 9 is provided with an outlet pipe 25 leading to an acid storage tank 10. An outlet pipe 26 may have branches 26a and 26b leading to the cation exchanger tanks 19a and 19b as well as branches 26c and 26d leading to the decolorizers 15a and 15b. Each branch may have valves 27a, 27b, 27c and 27d respectively disposed therein.

Thus to regenerate the cation exchangers, valves 21a or 21b are closed and acid is admitted by opening valves 27a or 27b. The regenerant then flows thru the exchanger and out thru salvage pipe branches 28a or 28b to a pipe 28 leading to a cation salt salvage tank 29.

To effect regeneration of the anion exchangers a pipe 30 leads from the alkali well 8 to a storage tank 35 which may have an outlet pipe 31 having branches 31a and 31b controlled by valves 32a and 32b. These branches lead to the anion exchangers 22a and 22b respectively. The pipe 31 may also have branches 31c and 31d leading to the decolorizers 15a and 15b and controlled by valves 32c and 32d. To operate the anion exchanger regeneration, the valves 21a or 21b are closed along with the valves in outlets 23a or 23b and the valves 32a or 32b are opened and the alkali may flow thru the anion exchanger tanks 22a or 22b. The spent regenerant is removed by valved pipes 33 and 34 connected to the bottom of the anion exchangers respectively and leading to an anion salt salvage tank 36.

The decolorizers are preferably cleaned by alternating flows of acid and alkali although alkali alone could be used. The acid wash is accomplished on the non-operating bank by opening valves 27c or 27d and permitting the acid to flow to a valved outlet 37 on decolorizer 15a or thru a pipe 38 on decolorizer 15b having a branch to the anion exchanger 22b and having a valve 39 at the outlet. If the wash is to be utilized in the exchanger, the valve in pipe 20a may be opened. The alkali wash is accomplished by opening valves 32c or 32d and permitting the spent wash to flow out the same outlets 37 and 39. If this spent wash is to be utilized, the valve 39 may be closed permitting the wash to flow into the anion exchanger 22b to regenerate it. Other pipe connections are obvious to completely save, salvage, or utilize the spent wash.

It will be apparent to those skilled in the art that commercial apparatus may differ considerably from the illustrative apparatus of Fig. 1. Accordingly there is illustrated in Fig. 2, only one possible commercial arrangement wherein the electrodialysis cells are in cascade. Accordingly dilute molasses may be fed into the bottom of a cell 6a and the lighter purer product may be taken off of the top to enter the bottom of a second cell 6b and its product may be taken off the top to enter the bottom of a third cell 6c. From there the electrodialized product may enter a bank 40 of decolorizer and exchangers. The final product may be further clarified in a carbon treatment and filter, and concentrated in liquid form to reduce shipping and consumer handling expense.

*Operation*

The entire apparatus having now been described, the operation of the process will now be outlined.

The molasses to be purified is diluted with about 50% of its volume of water and placed in tank 1. It is then fed at a regulated rate to the central compartment 4 of the electrodialysis cell 6 and water from a commercial source is fed into the wells 8 and 9. Acids are formed in well 9 due to the migration thru partition 7 of anions from the polar impurities of the molasses. Alkalies are formed at well 8 due to the migration of cations. The water may be continuously or intermittently fed to the wells 8 and 9 and the acids and bases may continuously or intermittently flow to their storage tanks 10 and 25. The molasses is purified and 50 to 80% of the impurities may be removed therefrom by the migration of the ions to the wells 8 and 9 and by the subsequent drawing off and storing of the resulting acids and alkalies or bases. In terms of ash content the molasses may be electrodialyzed until about 3% ash content remains for heavy ash (15%) molasses, and the lower practical limit at present appears to be about .5% ash considering relative costs of electrical current and regenerative materials.

The decolorizers 15a and 15b may be filled with granular resin absorbents of 10 to 12 mesh and granular activated carbon. This combination of substances in granular form seems to be much more effective for my electrodialized material than the usual decolorizers. As the partially purified material is fed into the decolorizers it has a black almost opaque color, and when it emerges from the decolorizers it is burgundy in color. As the material flows thru the ion exchangers it is progressively clarified and emerges as pale straw in color. This color syrup may be used by canners, but if further clarification is desired this may be obtained by any suitable process as indicated in Fig. 2.

The exchangers tanks 19a and 19b are filled with a granular cation exchanger material thru which liquid can percolate. A large variety of these exchanger materials are on the market and are generally organic chemicals in nature, chiefly resins. They have the ability of taking a positively charged ion out of solution and replacing it with an H+ ion to maintain the chemical balance of the liquid. The removed ion adheres to or is combined with the exchanger material.

This removed ion is eliminated by regenerating the exchanger with a supply of H+ ions which is done by circulating the acids from the acid storage tank thru the exchanger. The H+ restores the exchanger to its original condition and the liberated radical is flushed out of the exchanger and collected and salvaged at the tank 29.

The anion exchanger tanks 22a and 22b are likewise filled with a granular organic exchanger, but instead of giving up an H+ for a positively charged ion, this material exchanges an OH− for a negatively charged ion anion. The anion exchanger thus accumulates and holds these anions until it is regenerated. Regeneration is accomplished by passing alkalies thru the anion exchanger, and restoring the exchanger with OH− from the alkali, which in turn liberates the anion, permitting it to be flushed free of the exchanger and thus salvaged at the tank 36.

The anion salts and cation salts resulting from the regeneration and carried by the spent regenerating liquids may be valuable in themselves. These salts may be separated from the spent regenerant in any suitable fashion, and may then be sold or utilized commercially. In fact, my process is ideally suited for the recovery of polar materials from solution and there may be instances when the polar products are the desired product and the nonpolar solute the undesired substance. By process concentrates such polar substances, first in the electrodialysis cell, secondly in the ion exchangers and then uses this primary concentration to liberate additional polar material from the ion exchangers. Thus the primary cell concentrate is enriched by the secondary materials it liberates from the ion exchangers.

Another outstanding benefit and characteristic of my process is the germicidal action by the chlorinating of water in the electrodialysis step. Regardless of whether or not the original molasses is chlorinated, the natural salts present in molasses include chlorides, and when these salts are broken up during electrolysis, the chlorine ions migrate toward the positive electrode and when neutralized, become gaseous chlorine. This chlorine saturates the water at the well 9 where the acids are formed, giving rise to a powerful bactericidal action. Thus the regenerating acids are not only sterile, but render the cation exchangers sterile when they are regenerated, and the cation salvage solutions are also sterile.

Having now generally described my process, I will give hereinafter several specific examples and illustration of quantative data employed by me. The data varies according to the size of the installation and type of material and accordingly is useful for illustration only.

*Example I*

Final beet molasses was diluted by 50% of its volume of water. As thus diluted it contained 50% total solids, a sugar content of about 35% and an ash content of 7.5%, all based on weight. The specific gravity was about 1.25.

This diluted material was delivered to two cells in cascade and it was subjected to a current of about .77 kilowatt hour per litre. The current density applied was .2 ampere per square inch of electrode and direct current was used with a voltage differential to maintain this density. The diluted molasses after being treated in the cell had an ash content of 1.7% as determined by a conductivity meter, and tested 35% total solids with some increase in volume probably due to dilution from the electrode wells. It was dark black in color.

This cell product was next passed thru the decolorizers and came out a burgundy color. It was next passed thru the ion exchangers and was progressively lightened in color. The output from the ion exchangers showed an ash content of .05% as measured by a conductivity meter and tested 22% total solids. The material was then evaporated to 80% total solids producing a liquid sugar of light straw color and pleasant taste. The sugar content tested 79% giving a yield of 88% based on the original sugar content of the molasses.

The decolorized employed was granular organic resin and granular activated charcoal. The anion exchange material was of the aliphatic or aromatic amine type and the cation exchanger was of the sulphonated styrene type.

The volume of acids and alkalies generated in electrode wells of the cell were sufficient for complete regeneration of the ion exchangers plus enough for approximately two thirds of the regeneration or wash of the decolorizers.

*Example II*

Starting material was employed of the same type as in Example I. The end product of the cell had an ash content of .9% as determined by a conductivity meter. This material was then processed thru the decolorizers and ion exchangers and the resultant product had an ash content of .03% as determined by a conductivity meter and tested 19.5% total solids. In this run sufficient acids and alkalies were generated to completely regenerate the ion exchangers and the decolorizers. The consumption of electric current was greater, being .90 kilowatt hour per litre of starting material, the diluted original molasses.

This higher consumption indicates that the purification in the cell went further than in Example I accounting for the lower total solids and the relatively increased yield of acid as indicated by regenerating requirements.

The alkali and acid balance will vary somewhat according to the ash content of the original molasses and the end product from the cells.

It will be apparent to those skilled in the art that the selection of the changeover point from electrodialysis to ion exchange is dependent upon several technical and economic considerations. In an ideal system, the electrodialysis is continued until just sufficient acids and alkalies are formed as are necessary to regenerate the ion exchangers as this is well within the economic range of operation of the cell. Thus about half of the total impurities could be removed in each step. To obtain efficient regeneration, however, and to take care of the washing of the decolorizers, excesses of acids and alkalies are necessary. For this reason I prefer to remove 60 to 80% of the impurities in the electrodialysis step. If, however, commercially available regenerants become cheaper than those manufactured in my cell, then the changeover point can be varied to accomplish more of the impurity removal in the ion exchange step. Also, outside regenerants may be required for special purposes, such as providing for decolorizing material for the sugar. If electric current is very cheap, the electrodialysis step may be pushed slightly further, and if very expensive then it will be cheaper to shorten it and purchase regenerants.

As the examples show, the ion exchangers are very efficient. In example I, the change in ash content effected by the ion exchangers was from 1.7% to 0.05%, or a removal effectiveness of 97%. In Example II, the change is from 0.9% to 0.03%, or an effectiveness of 96.8%. In general the ion exchangers have a removal effectiveness on the order of 97%, on the basis of input of ash content to the ion exchangers.

The use of decolorizers also aids the ion exchange step since it removes or breaks down some of the gummy substances that tend to clog the ion exchangers.

Another important feature of my process is the elimination of filter steps to remove gummy substances, in contrast to most conventional purification processes for molasses. My electrodialysis step seems to break down these gummy substances and this combined with the overflow method of cascading several cells, seems to substantially eliminate gummy substances. As mentioned above the decolorizers eliminate nearly all the remaining gummy substances. Filtration is used in my process only to separate mechanical particles such as dirt, chips, etc.

Temperature control does not seem to be important in my process as good results are obtained at all ordinary temperatures. Liquid temperatures in excess of 70° C. would probably be detrimental however.

While I have described my invention with respect to several illustrative embodiments and examples, I do not limit myself to these illustrations, but include all modifications and variations as fall within the true spirit and scope of my invention.

I claim:

1. The method of purifying final molasses so that the sugar thereof may be used comprising: electrodialyzing the molasses until the ash content is no greater than 3%, accumulating acids and alkalies at the electrodes during the electrodialyzing action; thereafter ion exchanging anion and cations of the molasses until the desired purity is obtained; and regenerating the ion exchangers with the acids and alkalies formed during the electrodialyzing step.

2. The process of purifying final molasses comprising: electrodialyzing the molasses until 60 to 80% of polar impurities are removed; thereafter ion exchanging cations and anions of the electrodialyzed molasses in ion exchangers to remove about 97% of the ash content of the electrodialyzed molasses, whereby a relatively high concentration of electrolytes is maintained in the electrodialyzer and a relatively low concentration of electrolytes is obtained in the feed for the ion exchanger, thereby achieving a balanced, economical separation of salts and other impurities from the molasses.

3. The process of purifying final molasses comprising: diluting it with about 50% maximum of its volume of water; electrodialyzing the diluted molasses until its ash content is in the range from .5% to 3%; thereafter exchanging anions and cations of the electrodialized product until the ash content is no greater than .1%; and regenerating the ion exchangers with acids and alkalies formed during the electrodialyzing step.

4. The method of purifying molasses solutions comprising: electrodialyzing the solution until 60 to 80% of the polar impurities are removed and by-product acids and alkalies are formed; thereafter decolorizing the solution in a decolorizer until the bulk of the coloring matter is removed; ion exchanging anions and cations the decolorized material in ion exchangers having cation and anion exchangers until the desired purity is obtained; regenerating the cation exchangers with the acids; regenerating anion exchanger with alkalies and washing the decolorizer.

5. The method of obtaining from solutions concentrates of materials originally polar comprising; electrodialyzing a solution to concentrate ions at electrode wells to form acids and bases until about half the polar substances are removed; thereafter exchanging cations and anions of the solution to retain the bulk of the remaining polar substances in the ion exchangers; regenerating the ion exchangers with the acids and bases to form salts with the retained polar substances.

6. The process of purifying molasses solutions comprising subjecting a molasses solution to electrodialysis to remove 60% to 80% of the ash content of the solution and ion exchanging the electrodialyzed solution to remove remaining anions and cations, whereby a relatively high concentration of electrolytes is maintained in the electrodialyzer and a relatively low concentration of electrolytes is obtained in the feed for the ion exchanger, thereby achieving a complementary cooperation of the two processes to obtain an economical separation of salts, gums, and other impurities from the molasses solution.

7. The process according to claim 6, wherein the molasses solution is diluted with about 50% of its volume of water prior to electrodialysis.

8. The process according to claim 6, wherein the molasses solution is decolorized after electrodialysis and preceding the ion exchange.

References Cited in the file of this patent

UNITED STATES PATENTS

| Number | Name | Date |
|---|---|---|
| 455,631 | Maigrot et al. | July 7, 1891 |
| 741,689 | Miller | Oct. 20, 1903 |
| 751,179 | Kollrepp | Feb. 2, 1904 |
| 1,901,652 | Kean | Mar. 14, 1933 |
| 2,140,341 | Wallach | Dec. 13, 1938 |
| 2,388,222 | Behrman | Oct. 30, 1945 |
| 2,394,031 | Waksman | Feb. 5, 1946 |
| 2,413,844 | Rawlings | Jan. 7, 1947 |
| 2,490,716 | Smith | Dec. 6, 1949 |
| 2,502,614 | Zender | Apr. 4, 1950 |

FOREIGN PATENTS

| Number | Country | Date |
|---|---|---|
| 41,323 | Germany | Nov. 5, 1887 |
| 48,757 | Germany | Oct. 5, 1889 |
| 2,367 | Great Britain | of 1888 |

OTHER REFERENCES

Ser. No. 359,575, Smit (A. P. C.), published May 11, 1943.